Patented Aug. 20, 1929.

1,725,656

UNITED STATES PATENT OFFICE.

HAROLD MAXWELL-LEFROY, OF LONDON, ENGLAND, ASSIGNOR TO THE GRAESSER MONSANTO CHEMICAL WORKS, LIMITED, OF RUABON, NORTH WALES, A BRITISH COMPANY.

PROCESS OF TREATING MATERIALS TO RENDER THEM UNDESIRABLE AS A HABITATION FOR INSECTS.

No Drawing. Application filed June 15, 1925, Serial No. 37,347, and in Great Britain March 24, 1925.

This invention relates to improvements in the process of making materials undesirable as a habitation for insects.

According to this invention, I impregnate such materials with a small proportion of a polyhalogenated naphthalene or mixtures containing the same i. e., a naphthalene containing two or more atoms of halogen in the nucleus. The invention is very suitable for the treatment of materials such as textile fabrics.

The polyhalogenated naphthalenes are solid or semi-solid and their presence in large quantities would profoundly modify the physical properties of the material impregnated, but it has been found that when they are used in such small quantities that no substantial physical alteration is effected, the materials impregnated are nevertheless rendered undesirable as a habitation for insects. In the present invention therefore the materials are impregnated with such small quantities that no substantial physical change can be observed in the materials so impregnated. Preferably therefore the impregnation is effected by treating the materials with a dilute solution of a polyhalogenated naphthalene and removing the solvent. The polyhalogenated naphthalene may be used in conjunction with other impregnating agents. In the impregnation of materials such as wood the polyhalogenated naphthalene may be applied in a more concentrated form and the quantity employed may be considerably greater than in the case, for example, of textiles, since any slight modification of the physical properties will not be detrimental.

The invention further includes certain novel compositions for use in the process. The following examples, to which the invention is not limited, are appended to show the manner in which the invention may be put into practice.

*Example 1.*—Impregnate a textile yarn or fabric with a 5% solution of trichlor naphthalene or hexachlornaphthalene or mixtures thereof, dissolved in benzene. Evaporate off the solvent and the polychlorinated naphthalene will remain in the fabric, and on account of its low vapour tension it will not evaporate except very slowly. It will preserve the material against attack by moths.

The fabric may also be impregnated in other ways e. g. by exposure to a spray or mist of the solution, but the use of a liquid bath is preferable.

The amount of trichlornaphthalene remaining in the fabric will obviously depend not only upon the strength of the solution but also upon the amount which is allowed to remain on the fabric. Thus if the goods are drained in a centrifuge it will usually be necessary to employ at least a 10% solution.

The same result is not obtained by using liquid monochlornaphthalene alone, since though this is highly toxic, it is too volatile for the present purpose. Nor can any satisfactory permanent result be obtained by the use of the well known paradichlorbenzene because although this body is solid, it has a high vapour tension and volatilizes rapidly. These bodies may however be used in conjunction with the polychlorinated naphthalenes according to the present invention.

*Example 2.*—Impregnate timber with a solution of trichlornaphthalene with or without monochlornaphthalene in creosote or paraffin.

The following composition is suitable
  25 lbs monochlornaphthalene
  25 lbs trichlornaphthalene
  5 gallons paraffin Trichlornaphthalene exerts a specific toxic effect on the death watch beetle or on white ants.

*Example 3.*—Impregnate timber, e. g., roof timbers, with a mixture of 1 part of paraffin hydrocarbon sold as burning oil 300° which is a burning oil having an ignition point of 300° F. (or other carrier and penetrator), 1 part of paradichlorbenzene (or other volatile and highly toxic substance) and 1 part of hexachlornaphthalene or mixture of polychlorinated naphthalenes.

This mixture exerts a triple and highly effective action, namely the paraffin penetrates the wood and carries the toxic substance therein; the paradichlorbenzene exerts an immediate toxic action on certain organisms; while the less volatile chlorinated naphthalene derivative remains in the material and exercises a permanent toxic and preservative action. Creosote may be added if desired.

The invention may also be applied to the treatment of furs, leather and other materials.

The polychlorinated naphthalene may be replaced by the polybrominated naphthalenes or by mixed bromo-chloro-derivatives of naphthalene.

I declare that what I claim is:—

1. Materials impregnated with polyhalogenated naphthalene in amount sufficient to render them undesirable as a habitation for insects but insufficient to alter substantially their physical and mechanical properties.

2. Cellulosic materials impregnated with polyhalogenated naphthalene in amount sufficient to render them undesirable as a habitation for insects but insufficient to alter substantially their physical and mechanical properties.

3. Textile materials impregnated with polyhalogenated naphthalene in amount sufficient to render them undesirable as a habitation for insects but insufficient to alter substantially their physical and mechanical properties.

4. Materials impregnated with polychlorinated naphthalene in amount sufficient to render them undesirable as a habitation for insects but insufficient to alter substantially their physical and mechanical properties.

5. Cellulosic materials impregnated with polychlorinated naphthalene in amount sufficient to render them undesirable as a habitation for insects but insufficient to alter substantially their physical and mechanical properties.

6. Textile materials impregnated with polychlorinated naphthalene in amount sufficient to render them undesirable as a habitation for insects but insufficient to alter substantially their physical and mechanical properties.

In witness whereof, I have hereunto signed my name this 29th day of May 1925.

HAROLD MAXWELL-LEFROY.